United States Patent
Popovic

(10) Patent No.: US 9,377,535 B2
(45) Date of Patent: Jun. 28, 2016

(54) METHOD FOR TESTING GNSS-BASED POSITIONING SYSTEMS IN OBSTRUCTED ENVIRONMENTS

(75) Inventor: Zeljko Popovic, Royal Oak, MI (US)

(73) Assignee: Honda Motor Co., Ltd., Tokyo (JP)

( * ) Notice: Subject to any disclaimer, the term of this patent is extended or adjusted under 35 U.S.C. 154(b) by 966 days.

(21) Appl. No.: 13/309,932

(22) Filed: Dec. 2, 2011

(65) Prior Publication Data

US 2012/0139775 A1 Jun. 7, 2012

Related U.S. Application Data

(60) Provisional application No. 61/419,120, filed on Dec. 2, 2010.

(51) Int. Cl.
*G01S 19/23* (2010.01)
*G01S 19/48* (2010.01)

(52) U.S. Cl.
CPC ...... *G01S 19/23* (2013.01); *G01S 19/48* (2013.01)

(58) Field of Classification Search
CPC .................................. G01S 19/23; G01S 19/48
See application file for complete search history.

(56) References Cited

U.S. PATENT DOCUMENTS

| | | | |
|---|---|---|---|
| 5,648,901 A * | 7/1997 | Gudat et al. ............... | 701/23 |
| 6,127,970 A | 10/2000 | Lin | |
| 6,389,291 B1 * | 5/2002 | Pande et al. ............... | 455/456.5 |
| 6,496,778 B1 | 12/2002 | Lin | |
| 6,697,752 B1 | 2/2004 | Korver et al. | |
| 7,797,132 B1 | 9/2010 | Lele et al. | |
| 2007/0132636 A1 * | 6/2007 | Young et al. .............. | 342/357.15 |
| 2008/0039991 A1 * | 2/2008 | May et al. ................. | 701/25 |
| 2009/0047925 A1 | 2/2009 | Rahman | |
| 2009/0189810 A1 * | 7/2009 | Murray .................... | 342/357.14 |
| 2010/0268459 A1 | 10/2010 | O'Shea | |

FOREIGN PATENT DOCUMENTS

WO   WO 2008056972 A1 *   5/2008   ............... G01S 5/14

OTHER PUBLICATIONS

Jizhong Li; Muqing Wu, "The Improvement of Positioning Accuracy with Weighted Least Square Based on SNR," Wireless Communications, Networking and Mobile Computing, 2009. WiCom '09. 5th International Conference on , vol., No., pp. 1,4, Sep. 24-26, 2009 doi: 10.1109/WICOM.2009.5302600.*

Sturza, Mark A., "Navigation System Integrity Monitoring Using Redundant Measurements", Navigation, Journal of the Institute of Navigation, vol. 35, No. 4, Winter 1988-1989, pp. 483-502.*

* cited by examiner

*Primary Examiner* — Gregory C Issing
(74) *Attorney, Agent, or Firm* — Arent Fox LLP

(57) ABSTRACT

Methods of testing GNSS-based positioning systems in obstructed environments may include specifying a required accuracy threshold for use in determining a reference trajectory. One or more difficult areas of relatively poor or missing GNSS availability may be located within the obstructed environment. Positioning information may be established for first reference points outside the difficult areas. Subsequently, by surveying with respect to the first reference points, positioning information may be established for second reference points within the difficult areas. The first and second reference points may then be used to determine a true path associated with the reference trajectory. When an improved GNSS-based positioning system is navigated along the reference trajectory, a set of measured points may be gathered, and errors between the true path and a measured path (derived from the measured points) may thereby be evaluated with respect to statistical characteristics, or to other improved GNSS-based positioning systems.

25 Claims, 15 Drawing Sheets

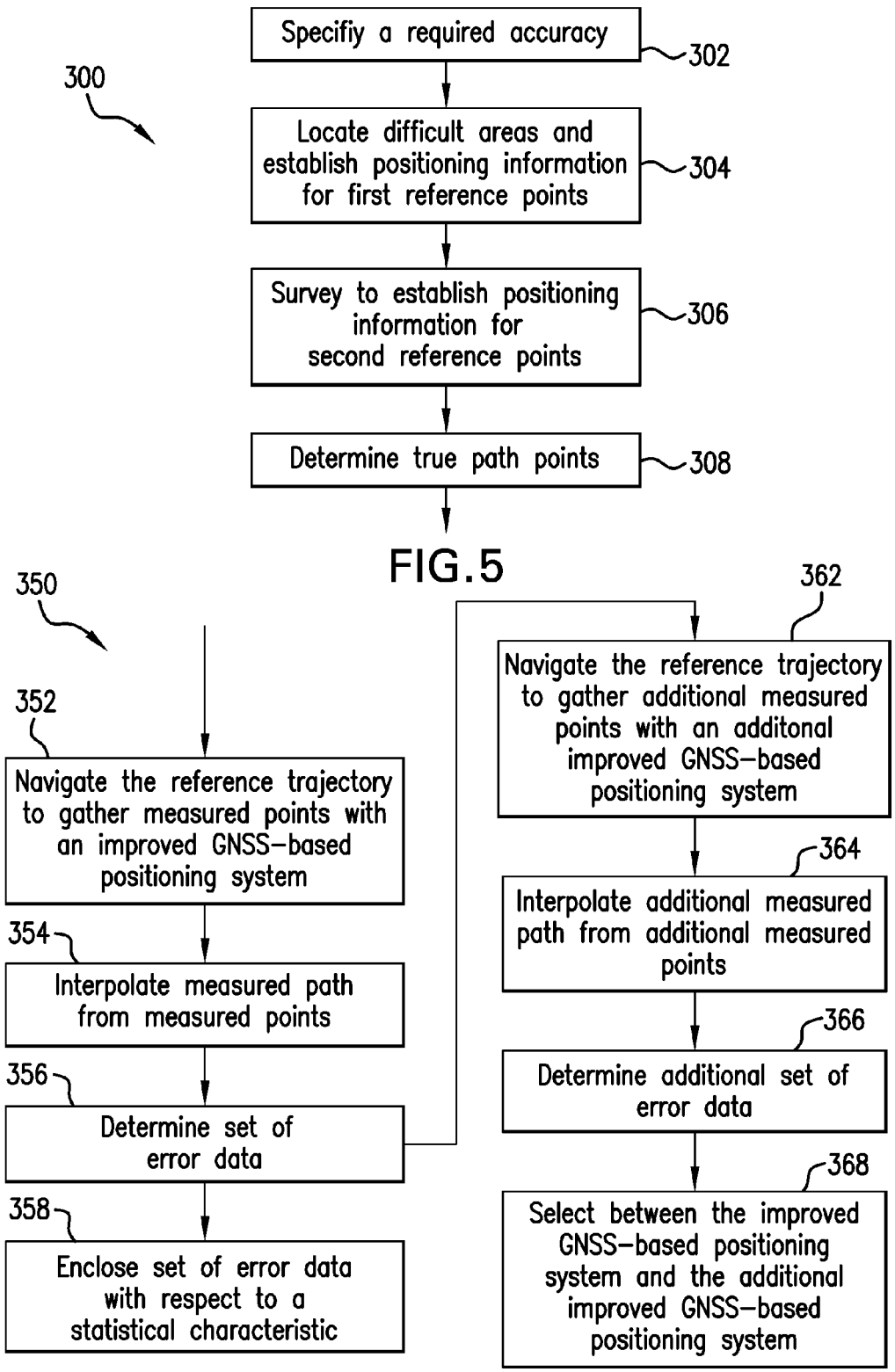

METHOD FOR TESTING GNSS-BASED POSITIONING SYSTEMS IN OBSTRUCTED ENVIRONMENTS

CROSS-REFERENCE TO RELATED APPLICATION

This application claims priority under 35 U.S.C. §119(e) to U.S. Provisional Patent Application No. 61/419,120, entitled "A Method for Testing GPS in Obstructed Environments where GPS/INS Reference Systems Can be Ineffective," and filed on Dec. 2, 2010, which application is hereby incorporated by reference.

BACKGROUND

The benefits of automobiles have unfortunately come with tragic costs. There were 37,261 fatalities on American roads in 2008. Automobile collisions rank as the eleventh leading cause of death irrespective of age and the first leading cause of death for those between 15 and 24 years old. Preventing such collisions would protect property, health, and most importantly lives. Recent maturation of some fundamental technologies has allowed engineers to develop new means of preventing automobile collisions.

These new collision avoidance technologies may rely upon communication, either in part or entirely, as a means of co-operatively avoiding collisions. Collaborative efforts between automotive Original Equipment Manufacturers (OEMs) have demonstrated the feasibility of vehicle-to-vehicle (V2V) and vehicle-to-infrastructure (V2I) communication as means of co-operatively avoiding collisions.

Wireless communication in such systems allows vehicle position, velocity, and other relevant parameters to be shared among neighboring vehicles, which in turn allows for calculating collision risks, providing warnings to the driver, and potentially even initiating mitigating actions. To be effective, these co-operative vehicle safety technologies require that all involved vehicles use the same communication protocol. The draft standard known as Dedicated Short Range Communications (DSRC) defines a communication medium and a message set for such a communication protocol, thereby providing for the communication and sharing of various parameters among neighboring vehicles.

Many important parameters usually are already available within proprietary in-vehicle networks. Parameters such as brake status and turn-signal status may be used to infer a driver's intentions and need only be converted into standard packaging for broadcasting to other vehicles. Arguably the most critical pieces of shared information are vehicle position and time. For co-operative safety applications to work, position and time need to be expressed in relation to other vehicles and thus require a common reference frame.

In this regard, the use of GNSS (Global Navigation Satellite Systems) has proven valuable. A GNSS includes a constellation of multiple man-made Earth-orbiting satellites with precisely determinable orbits. A user of the system employs a device (a GNSS receiver) to obtain positioning information in Earth-based absolute co-ordinates of latitude, longitude, and height, by solving equations involving measurements of signal travel times from at least four GNSS satellites. The first such system, and the one most widely used, is the Global Positioning System (GPS) created by the United States government. Although the term GNSS includes GPS, it is a generic term and encompasses any such system, including for example GLONASS (a Russian GNSS) and Galileo (a European GNSS).

GPS has nearly global coverage and accessibility in open sky conditions. However, the availability of GNSS-based positioning information in obstructed environments—including, significantly, areas like dense urban areas—is often poor. Efforts are under way to improve the performance of GNSS-based positioning systems in obstructed environments by combining GNSS sensors with other sensors. In order to be evaluated, these improved GNSS-based positioning systems share a need to calculate a positioning error as a difference between a reference trajectory and a trajectory measured by the improved GNSS-based positioning system, although the systems may differ in how the reference trajectory is determined.

Reference trajectories may be determined, for example, through GNSS-based methods incorporating high-grade inertial sensors or differential corrections. However, such methods may become ineffective for extremely difficult environments, or may become prohibitively expensive for projects of limited budget. Various other methods of determining reference trajectories may have other drawbacks that may make them impracticable due to a dependence upon GNSS-derived positioning information. Accordingly, there is a need for a method of testing improved GNSS-based positioning systems that does not require the use of GNSS in determining reference trajectories.

SUMMARY

In one aspect, a method for setting up a test for a GNSS-based positioning system along a reference trajectory within an obstructed environment is provided. The method comprises steps of establishing and surveying.

In one step, the method includes establishing positioning information for each of a plurality of first reference points outside a difficult area of the obstructed environment, a GNSS availability within the difficult area being less than a GNSS availability in a good area of the obstructed environment. In another step, the method includes surveying from the first reference points to establish positioning information for each of a plurality of second reference points within the difficult area, the second reference points being selected to ensure that an accuracy of the positioning information for the second reference points satisfies a required accuracy threshold for the reference trajectory.

In another aspect, a method for producing a reference trajectory for testing a GNSS-based positioning system in obstructed environments is provided. The method comprises steps of specifying, locating, establishing, and surveying. In one step, the method includes specifying a required accuracy threshold for the reference trajectory. In another step, the method includes locating a plurality of difficult areas within the obstructed environment, a GNSS availability within the difficult areas being less than a GNSS availability within areas outside the difficult areas, and an accuracy of GNSS-based positioning information within the difficult areas not satisfying the required accuracy threshold. In another step, the method includes establishing positioning information for a plurality of first reference points, the first reference points being outside the difficult areas, and the positioning information for the first reference points satisfying the required accuracy threshold. In another step, the method includes surveying to establish positioning information for a plurality of second reference points, the second reference points being inside the difficult areas, the positioning information for the second reference points being based on the positioning information for the first reference points, and a configuration of the second reference points enabling the positioning information for the second reference points to satisfy the required accuracy threshold. In another step, the method includes determining a plurality of true path points based upon the positioning information for at least the second reference points.

In yet another aspect, a method for testing a GNSS-based positioning system along a reference trajectory within an obstructed environment is provided. The method comprises steps of specifying, establishing, surveying, gathering, and determining. In one step, the method includes specifying a required accuracy threshold for the reference trajectory. In another step, the method includes establishing positioning information for a plurality of first reference points within a good area of the obstructed environment, a GNSS availability within the good area being greater than a GNSS availability within a difficult area of the obstructed environment. In another step, the method includes surveying from the first reference points to establish positioning information for a plurality of second reference points within the difficult area, a positioning of the second reference points ensuring that an accuracy of the positioning information for the second reference points satisfies the required accuracy threshold. In another step, the method includes gathering a plurality of measured points corresponding with the reference trajectory using the GNSS-based positioning system. In another step, the method includes determining an error data set based upon a distance from each of the second reference points to a linear interpolation among the plurality of measured data points.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The embodiments of the invention can be better understood with reference to the following drawings and description. The components in the figures are not necessarily to scale; instead, emphasis is placed upon illustrating the principles of the invention. Moreover, in the figures, like reference numerals designate corresponding parts throughout the different views.

FIG. 5 is an embodiment of a flow diagram depicting a first part of a method of testing improved GNSS-based positioning systems in obstructed environments;

FIG. 6 is an embodiment of a flow diagram depicting a second part of a method of testing GNSS-based positioning systems in obstructed environments;

DETAILED DESCRIPTION

A method for testing improved GNSS-based systems along a reference trajectory within obstructed environments is provided. Also provided are a method for setting up a test for improved GNSS-based positioning systems along reference trajectories within obstructed environments, and a method for producing reference trajectories for testing GNSS-based positioning systems in obstructed environments.

Figure 1:
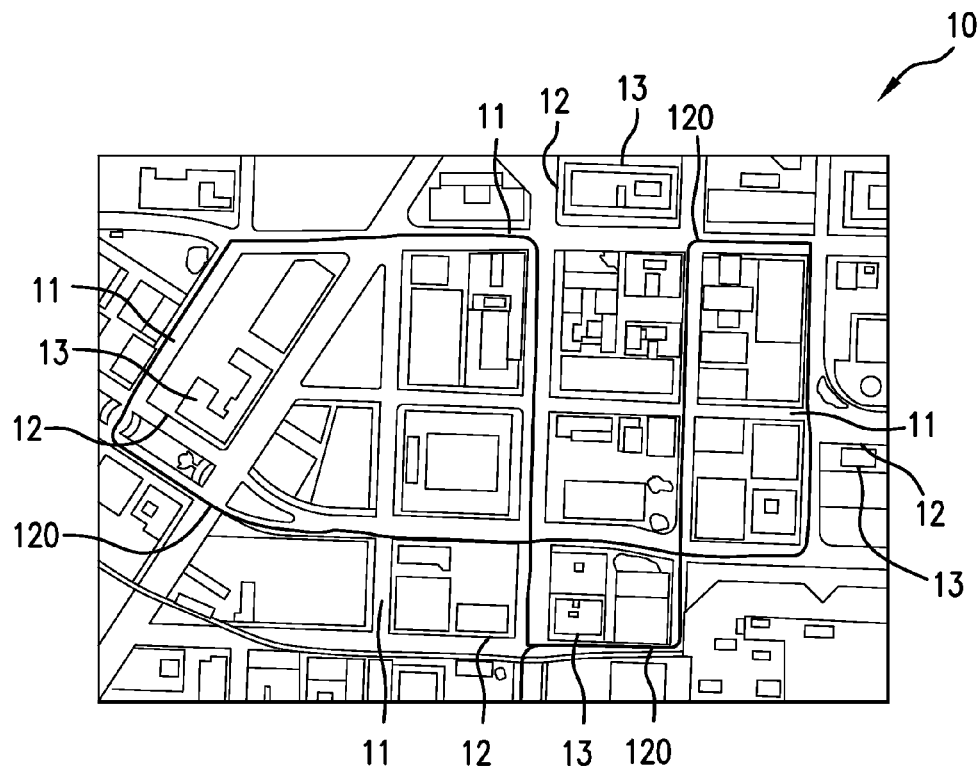
FIG. 1 is an embodiment of a top view of a reference trajectory along various streets in a dense urban area.

FIGS. 1-4 are embodiments of top views of an obstructed environment 10. As depicted in FIG. 1, obstructed environment 10 is a dense urban area that includes an interconnected plurality of streets 11 surrounding a plurality of city blocks 12 as well as a plurality of buildings 13 distributed among city blocks 12. Each street 11 may vary in width from other streets 11, and the width of each street 11 at any one location may vary from widths at other locations along the same street 11. Similarly, each building 13 may vary in height from other buildings 13, and the height of any one portion of any building 13 may vary from heights of other portions of the same building 13. Accordingly, physical characteristics of the streets 11 and buildings 13 may vary substantially across obstructed environment 10.

GNSS positioning information may be unavailable at some portions of the dense urban area. That is, within obstructed environment 10, there may be one or more areas (such as positions at ground level or street level) at which buildings 13 partially block a view of the sky in such a way that the quality of GNSS positioning information available at those positions is degraded or otherwise reduced. At such locations, for example, the HDOP (Horizontal Dilution of Precision) of GNSS positioning information may be greater than or equal to a particular threshold of acceptability, or the number of satellites viewable from that position may be less than or equal to a particular threshold of acceptability, or both. Accordingly, GNSS positioning information obtained at those locations may be inaccurate or of otherwise undesirable quality.

Although FIG. 1 depicts a dense urban environment, other obstructed environments may exist. For example, undesirable obstructions may exist in urban areas that are not relatively dense, or in suburban or rural areas. Undesirable obstructions may also exist due to non-man-made features, such as rocky or wooded terrain. Obstructions due to man-made features and obstructions due to non-man-made features may also combine to produce a level of total GNSS obstruction that is greater than level of GNSS obstruction due to any of the features in isolation. Accordingly, obstructed environment 10 may be any environment in which GNSS positioning information obtained at locations therein may be inaccurate or of otherwise undesirable quality.

FIG. 1 also depicts a reference trajectory 120 along various streets 11 in obstructed environment 10. Reference trajectory 120 is a route within obstructed environment 10 to be traveled in the course of testing improved GNSS-based positioning systems.

Figure 2:
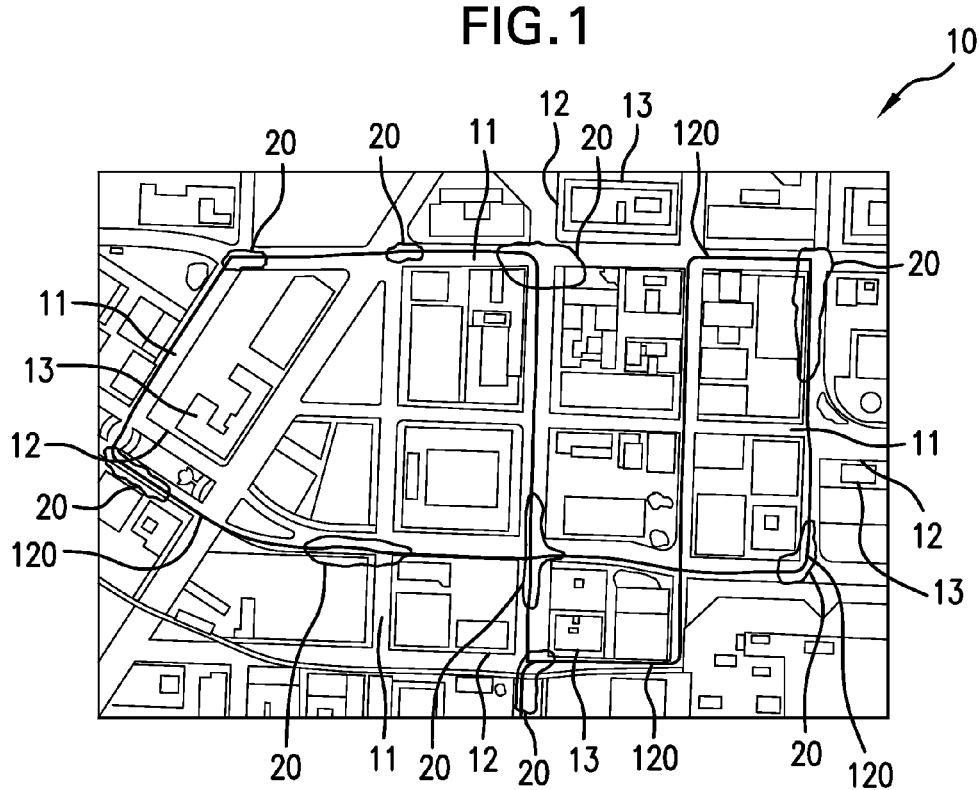
FIG. 2 is an embodiment of a top view of the reference trajectory, additionally depicting areas in which GNSS availability is poor.

FIG. 2 depicts reference trajectory 120 along with a plurality of difficult areas 20 that encompass portions of reference trajectory 120. Within difficult areas 20, GNSS availability may be poor, i.e., GNSS positioning information may be inaccurate or of otherwise undesirable quality. For example, within portions of difficult areas 20, an HDOP associated with an attempt at GNSS positioning may be greater than or equal to a particular threshold of acceptability, or a number of available satellites associated with an attempt at GNSS positioning may be less than or equal to a particular threshold of acceptability, or both.

Other portions of difficult areas 20 may be portions in which GNSS availability is missing or indeterminate. For example, an attempt at GNSS positioning at a location along reference trajectory 120 may yield no positioning information, or positioning information that deviates from reference trajectory 120 by more than a predetermined threshold amount, or exceeds an error threshold.

Figure 3:
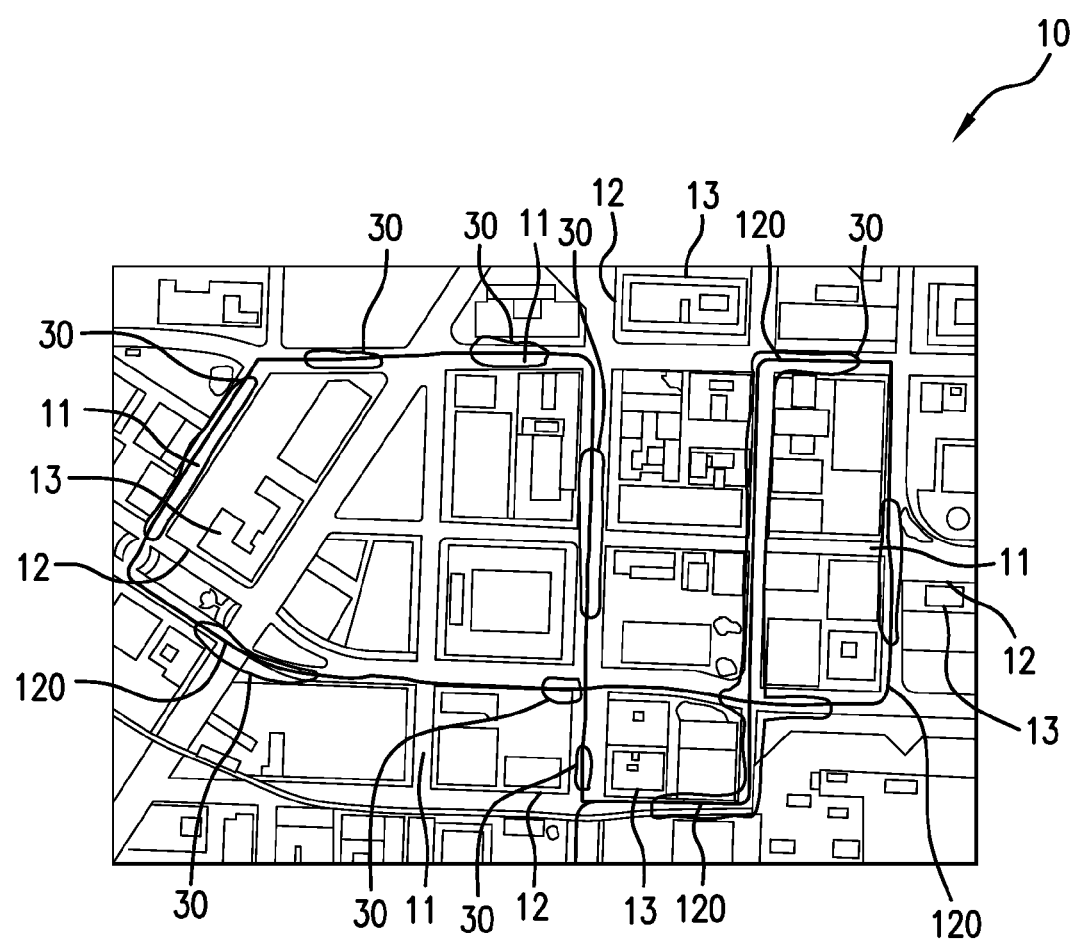
FIG. 3 is an embodiment of a top view of the reference trajectory, additionally depicting areas in which GNSS availability is good.

FIG. 3 depicts reference trajectory 120 along with a plurality of good areas 30 that encompass portions of reference trajectory 120 outside difficult areas 20. Within good areas 30, GNSS availability may be good, i.e., GNSS positioning information may be accurate or of otherwise desirable quality. For example, within good areas 30, an HDOP associated with an attempt at GNSS positioning may be less than or equal to a particular threshold of acceptability, or a number of available satellites associated with an attempt at GNSS positioning may be greater than or equal to a particular threshold of acceptability, or both.

Moreover, good areas 30 may be spaced from difficult areas 20 along reference trajectory 120. That is, GNSS availability along reference trajectory 120 may be good in some areas, and difficult in other areas; and portions of reference trajectory 120 between these areas may be portions in which GNSS availability is missing or indeterminate. For example, in areas between difficult areas 20 and good areas 30, attempts at GNSS positioning may yield no positioning information, or positioning information that exceeds a predetermined threshold amount, such as an error threshold.

Alternatively, difficult areas 20 may be any areas in obstructed environment 10 in which attempts at GNSS positioning do not yield positioning information within a required accuracy threshold, while attempts outside of difficult areas 20 may be any areas in obstructed environment 10 in which attempts at GNSS positioning do yield positioning information within a required accuracy threshold.

Figure 4:
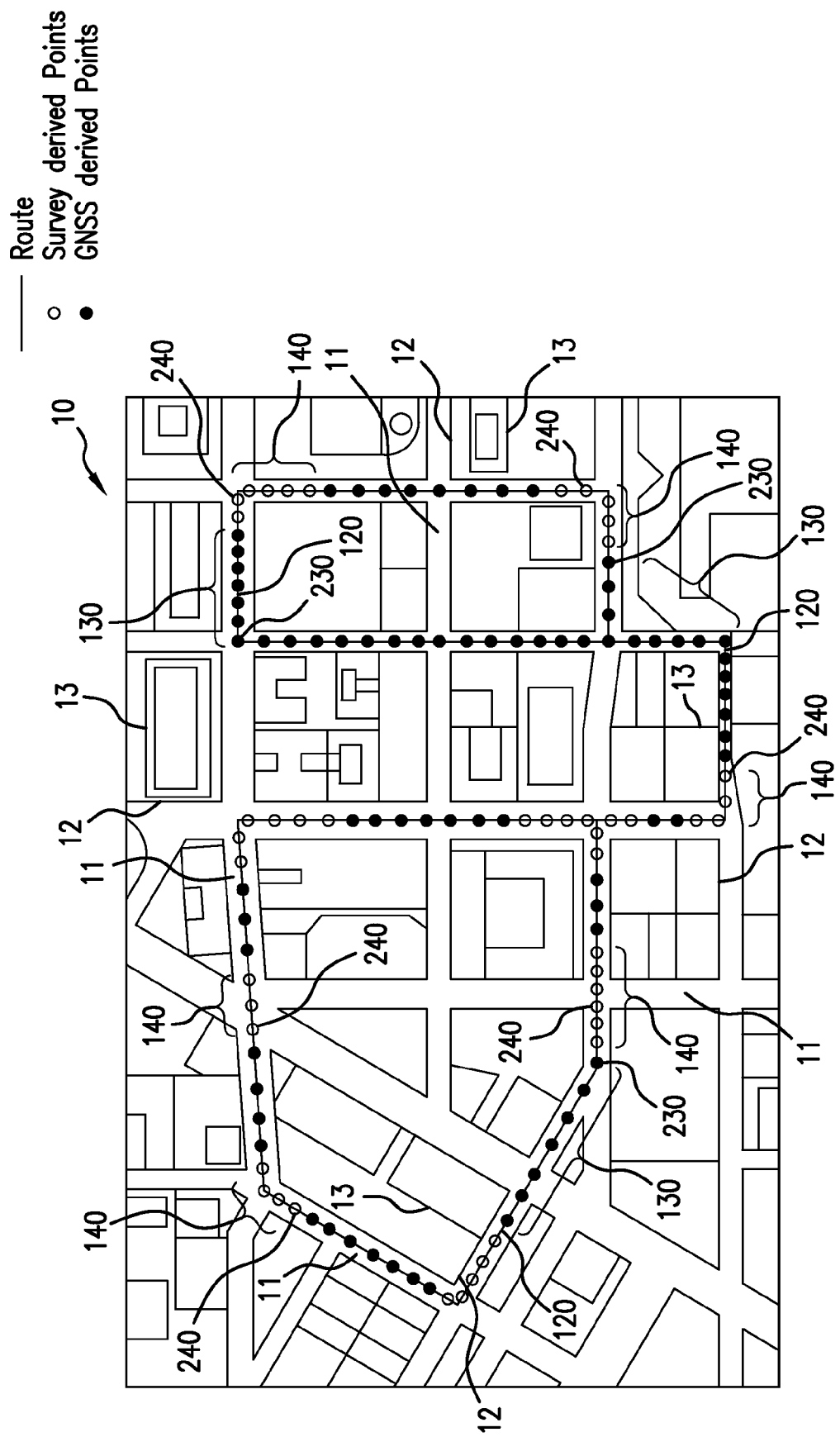
FIG. 4 is an embodiment of a top view of the reference trajectory, depicting various reference points along the reference trajectory.

FIG. 4 depicts reference trajectory 120 as having various reference points within first portions 130 and second portions 140 of reference trajectory 120. First portions 130 may be portions of reference trajectory 120 corresponding with good areas 30, whereas second portions 140 may be portions of reference trajectory 120 corresponding difficult areas 20. Alternatively, in some embodiments, first portions 130 may be portions of reference trajectory 120 corresponding with areas outside of difficult areas 20 (which may include good areas 30), while second portions 140 may be portions of reference trajectory 120 corresponding with areas outside of good areas 30 (which may include difficult areas 20).

FIG. 4 also depicts a number of reference points along reference trajectory 120 for which positioning information has been determined, including first reference points 230 and second reference points 240. First reference points 230 are substantially located along reference trajectory 120 and within first portions 130. Similarly, second reference points 240 are substantially located along reference trajectory 120 and within second portions 140. Accordingly, first reference points 230 may be reference points located outside of difficult areas 20, and second reference points 240 may be reference points located within difficult areas 20.

FIG. 5 is an embodiment of a flow diagram depicting a first part 300 of a method for testing improved GNSS-based positioning systems in obstructed environments. First part 300 includes a plurality of steps 302-308. These steps may also be included in a method for setting up a test for improved GNSS-based positioning systems along reference trajectories, as well as in a method for producing reference trajectories for testing GNSS-based positioning systems in obstructed environments.

In step 302, a required accuracy threshold for the reference trajectory is specified. The required accuracy threshold may advantageously be one to two orders of magnitude better than the expected accuracy of the improved GNSS-based positioning system to be evaluated. An accuracy threshold of 0.1 to 0.01 meters, for example, may be appropriate in determining reference points in order to ensure that interpolated positioning information for portions of reference trajectory 120 is within the expected accuracy of the improved GNSS-based positioning system to be evaluated. Alternate accuracy thresholds may also be useful. For example, a required accuracy threshold of 10 meters may be useful in detecting road-level identification, whereas a required accuracy threshold of 2 meters may be useful in detecting lane-level identification.

Then, in step 304 and with reference to FIG. 4, one or more difficult areas 20 within obstructed environment 10 are located, and positioning information is established for a plurality of reference points located outside of difficult areas 20, i.e., first reference points 230. Positioning information may include a longitude and a latitude, for example, or may be expressed as points within a two-coordinate space (i.e., as an x-coordinate and a y-coordinate). Positioning information may be established for first reference points 230 using any trusted positioning reference, including GNSS-based positioning references.

Subsequently, in step 306, positioning information is established, by surveying, for a plurality of reference points located within difficult areas 20, i.e., second reference points 240. The surveying may be geodetic surveying (i.e., land surveying), and may employ GNSS-based positioning instrumentation in determining positioning information where GNSS availability is good. The surveying may also employ optical or other instrumentation, such as tacheometers and theodolites.

Using first reference points 230 as known control points outside difficult areas 20, offsets from first reference points 230 to second reference points 240 within difficult areas 20 may be established through land surveying techniques and the use of surveying equipment which may not be reliant upon GNSS-based positioning. Positioning information for second reference points 240, based on the positioning information for the first reference points, may thereby be determined by surveying.

Figure 7:
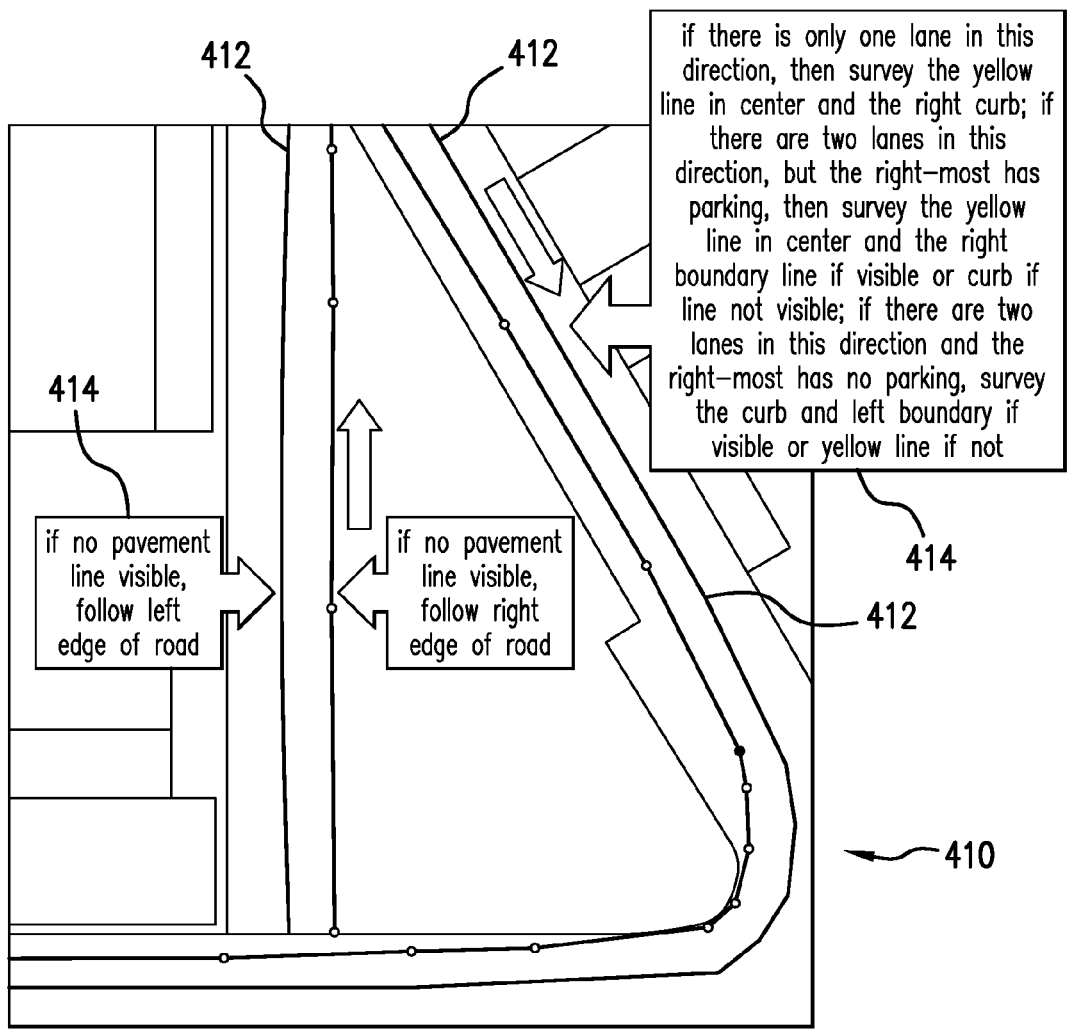
FIG. 7 is an embodiment of a survey instruction diagram corresponding with a first portion of the reference trajectory, including information and instructions to be used in a survey.

The surveying may be directed by maps, photographs, and other useful diagrams to specify the points to be surveyed. FIG. 7 is an embodiment of a survey instruction diagram 410 corresponding with a first portion of reference trajectory 120. Survey instruction diagram 410 includes information and instructions to be used in a survey, i.e., lane boundary indicators 412 and text instructions 414.

Lane boundary indicators 412 indicate lines along which survey points are to be measured in establishing second reference points 240. As depicted in FIG. 7, lane boundary indicators 412 indicate, for example, left-side and right-side boundaries of a lane to be navigated during the testing of the improved GNSS-based positioning systems.

Text instructions 414 provide verbal descriptions of the surveying to be done. Text instructions may make reference to a number of permanent or semi-permanent landmarks related to the points to be surveyed, such as road edges, lane markings, manhole covers, lamp-posts, etc. (Surveying along the desired boundary indicators 412 may then include surveying to establish positioning information for any such permanent or semi-permanent landmarks in order to establish positioning information along boundary indicators 412.)

Figure 8:
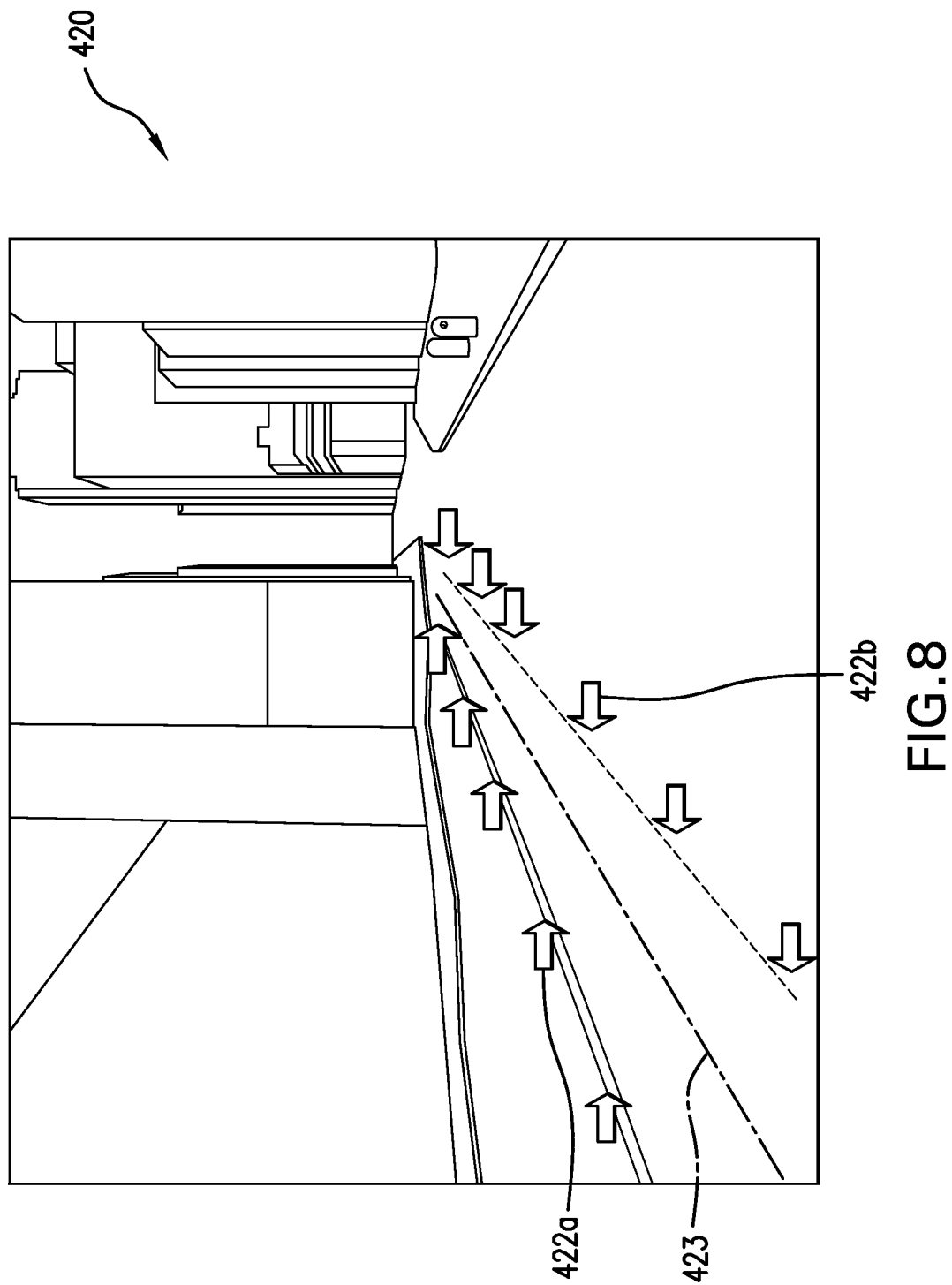
FIG. 8 is an embodiment of another survey instruction diagram showing a street-level perspective view corresponding with a second portion of the reference trajectory, including information regarding lane boundaries.

FIG. 8 is an embodiment of another survey instruction diagram 420 showing a street-level perspective view corresponding with a second portion of reference trajectory 120. Survey instruction diagram 420 includes information regarding lane boundaries, i.e., a plurality of first lane boundary indicators 422a, a plurality of second lane boundary indicators 422b, and a plurality of lane centerline indicators 423. First lane boundary indicators 422a may follow a left-hand edge of a lane to be surveyed, while second lane boundary indicators 422b may follow a right-hand edge of the lane.

Lane boundary indicators 422a and 422b may correspond in some places with physical lane boundary lines on streets 11, but may in other places not correspond with such lines. Instead, lane boundary indicators 422a and 422b serve to help indicate portions of obstructed environment 10 to be surveyed.

Lane centerline indicators 423 may be points located between the line of first lane boundary indicators 422a and second lane boundary indicators 422b, and may indicate an imagined lane centerline between lane boundaries. The survey instructions may indicate that only lane boundaries are to be surveyed, in which case positioning information for points along the lane centerline may be extrapolated from the positioning information of the lane boundaries. In such cases, step 306 may define lane boundaries, second reference points 240 may be surveyed points along lane boundaries as indicated by the various survey instruction diagrams, and the lane centerline may then be determined by interpolation between surveyed points along lane boundaries as indicated by the various survey instruction diagrams. Alternatively, the survey instructions may indicate that the lane centerline itself is to be surveyed, in which case positioning information for points along the lane centerline may be determined directly by surveying points along the lane centerline.

During the course of the survey, second reference points 240 may be selected to ensure that an accuracy of the positioning information for the second reference points satisfied the required accuracy threshold for the reference trajectory. For example, each second reference point 240 may be spaced close enough to all the other reference points for which positioning information has already been determined to ensure that the positioning information determined for the second reference point 240 in question will satisfy the required accuracy threshold for reference trajectory 120. Second reference points 240 may then be added one at a time in a manner that ensures that each second reference point 240 satisfies the required accuracy threshold for reference trajectory 120, until all second reference points 240 have been added. Second reference points 240 may satisfy the required accuracy threshold for reference trajectory 120 when positioning information for parts of reference trajectory 120 between second reference points 240 is within the expected accuracy of the improved GNSS-based positioning system to be evaluated. This may in turn occur when the required accuracy threshold greatly exceeds the expected accuracy of the improved GNSS-based positioning system to be evaluated.

Put another way, a physical configuration or layout of second reference points 240 within the coordinates of obstructed environment 10 (i.e., within the longitude and latitude range, or x-coordinate and y-coordinate range, of obstructed environment 10) may thereby enable second reference points 240 to satisfy the required accuracy threshold for reference trajectory 120. Such a physical configuration may include a spacing, a pattern, or other positional relationship between or among second reference points 240, and may include a spacing, a pattern, or other positional relationship between at least some of second reference points 240 and at least some of first reference points 230.

Figure 11:
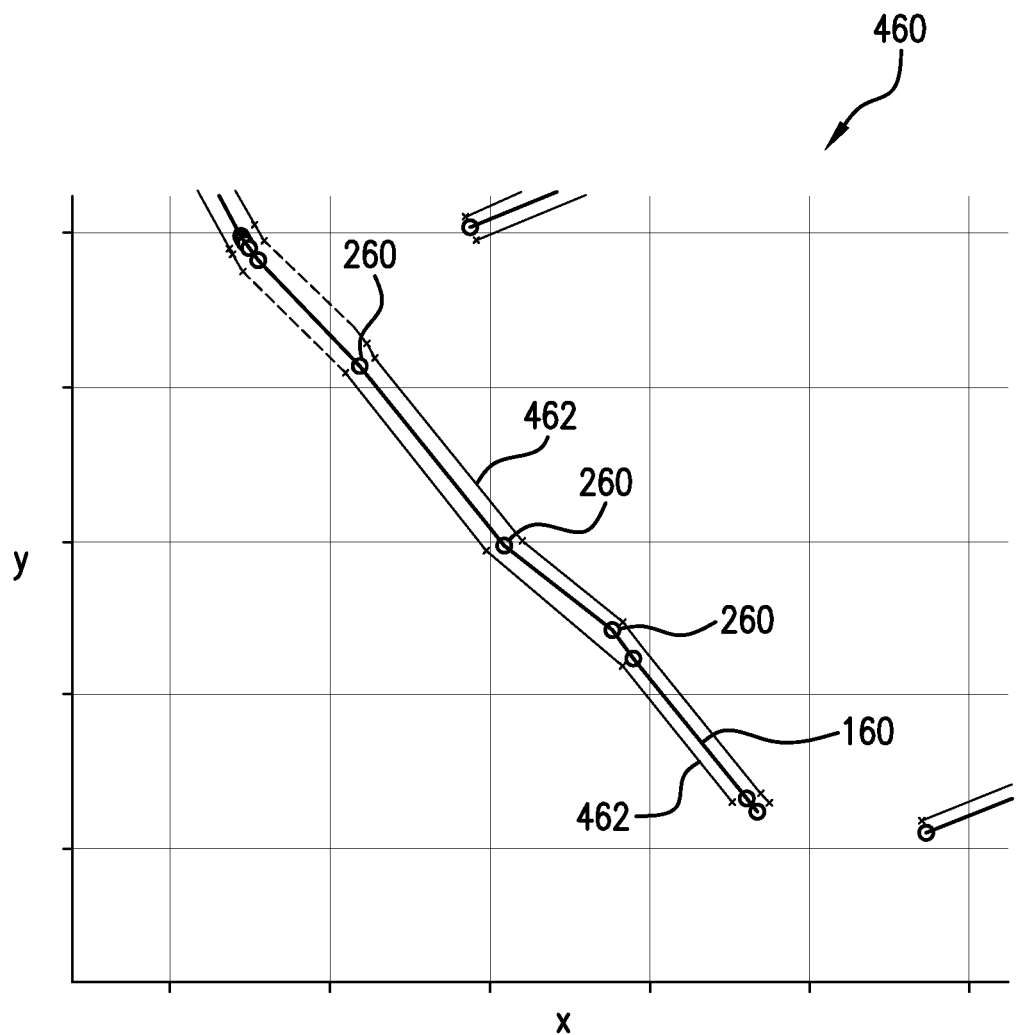
FIG. 11 is an embodiment of a map of positioning information for a fourth portion of the reference trajectory, including survey-based boundary lines and a true path.
Figure 12:
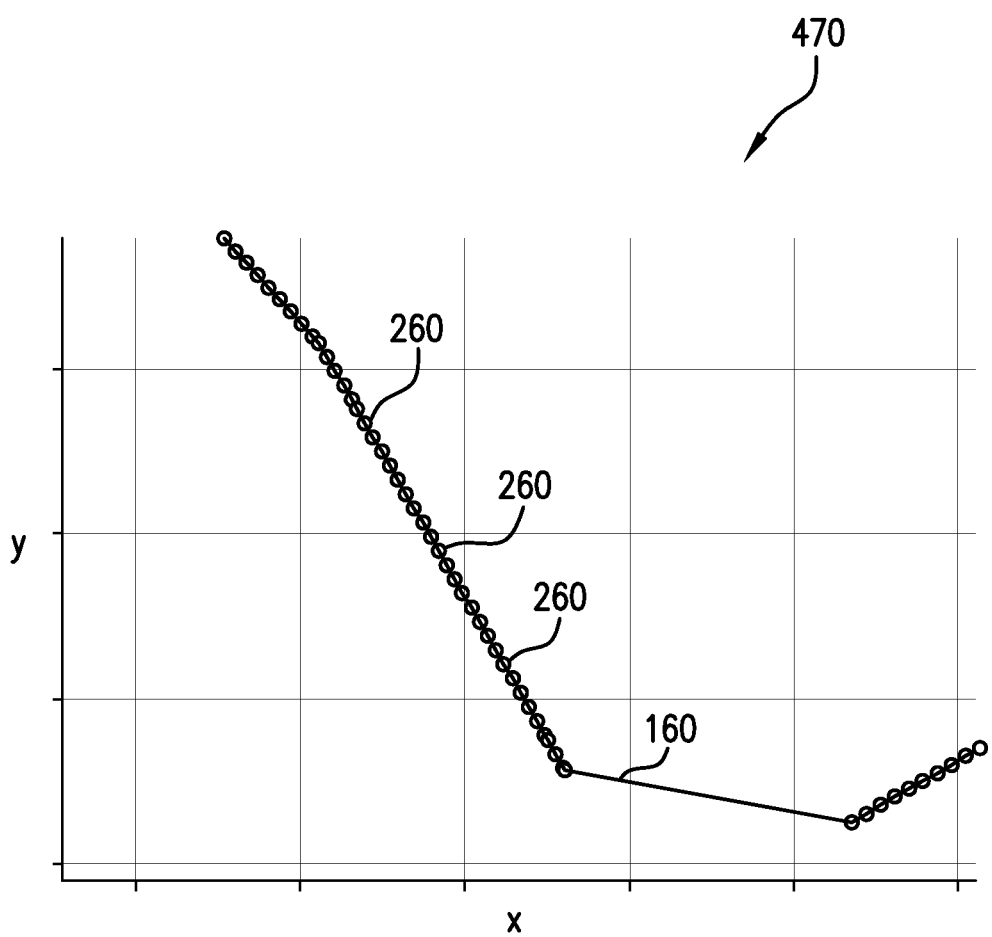
FIG. 12 is an embodiment of another map of positioning information for the fourth portion of the reference trajectory, including the true path, with fine point spacing.

Returning to FIG. 5, and with reference to FIGS. 11 and 12, in step 308, a plurality of true path points 260 along a true path 160 may be determined based upon the positioning information for both the first reference points and the second reference points. True path points 260 correspond with reference trajectory 120 and are determined based upon the positioning information for both first reference points 230 and second reference points 240. In particular, true path points 260 correspond with a lane centerline along reference trajectory 120.

In turn, either first reference points 230, second reference points 240, or both may correspond with lane boundaries along reference trajectory 120 and may be points along the lane boundaries. In such cases, positioning information for true path points 260 corresponding with a lane centerline along reference trajectory 120 may be determined based upon positioning information for first reference points 230, second reference points 240, or both.

Alternatively, either first reference points 230, second reference points 240, or both may correspond with a lane centerline along reference trajectory 120, and may be points along the lane centerline itself. In such cases, first reference points 230, second reference points 240, or both may themselves be true path points 260, and positioning information for such true path points 260 may be determined directly from the positioning information for first reference points 230, second reference points 240, or both.

Additionally, in determining true path points 260, the plurality of first reference points 230 may include points for which positioning information has directly been established, as well as points interspersed among, extrapolated from, or interpolated therebetween. Similarly, the plurality of second reference points 240 may include points for which positioning information has been directly established, as well as points interspersed, extrapolated from, or interpolated therebetween. Accordingly, true path points 260 may include first reference points 230 and second reference points 240, as well as points along lines extrapolated from or interpolated between first reference points 230 and second reference points 240; and true path points 260 may also include any other points along true path 160.

In some embodiments, positioning information may be determined for first reference points 230 and second reference points 240 throughout a wide range of obstructed environment 10, and the determination of true path 160 and the corresponding true path points 260 may include picking a route for the reference trajectory and selecting a sub-set of the available first reference points 230 and a sub-set of the available second reference points 240 corresponding with that route.

For example, positioning information may be obtained for first reference points 230 and second reference points 240 corresponding with substantially all lane boundaries in substantially all streets 11 in some portion of, or all of, obstructed environment 10. Then, once positioning information for all lane boundaries is known, a route bounded by some of those lane boundaries may be picked, and the sub-sets of first reference points 230 and second reference points 240 associated with that particular route may be used to determine positioning information for true path 160 and true path points 260.

In such embodiments, reference trajectory 120 may be determined after positioning information for first reference points 230 and second reference points 240 has been determined. First portions 130 and second portions 140 may then correspond with first reference points 230 and second reference points 240 along the determined reference trajectory 120.

Figure 9:
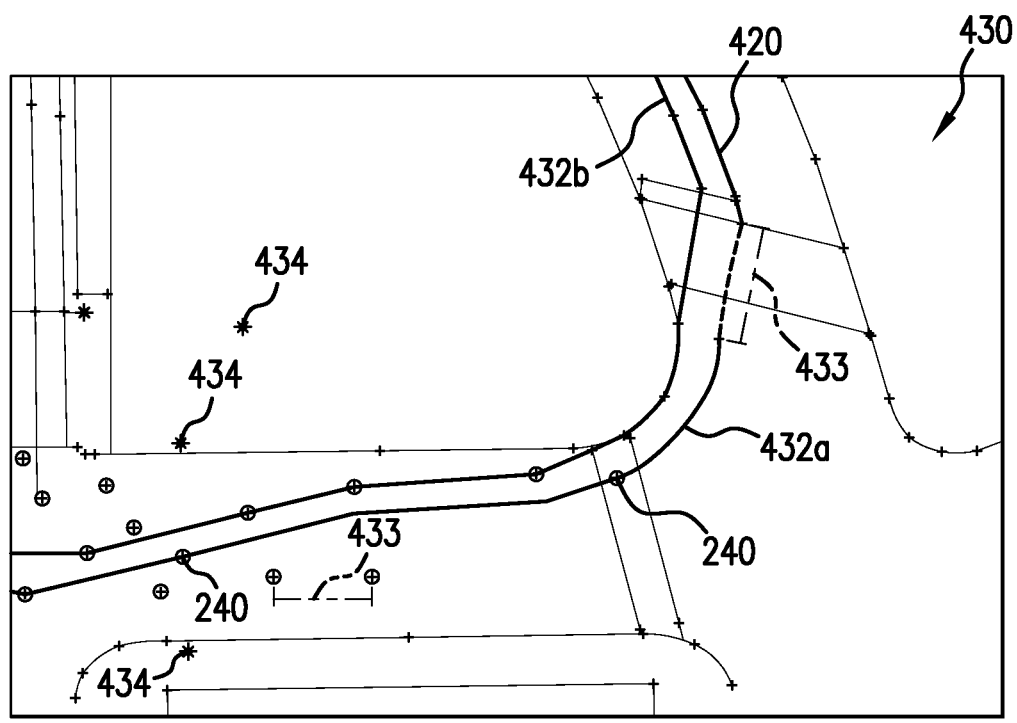
FIG. 9 is an embodiment of a map of the first portion of the reference trajectory, including information resulting from the survey.

FIG. 9 is an embodiment of a map 430 of the first portion of reference trajectory 120 (as depicted in FIG. 7 above), including information resulting from the survey. Map 430 depicts second reference points 240 along each of a first lane boundary 432a (which corresponds with a left-side lane boundary) and a second lane boundary 432b (which corresponds with a right-side lane boundary). Although lane boundaries 432a and 432b may correspond with physical lane boundary lines in some places, in other places, they may cross physical lane boundary lines, or physical lane boundary lines may be absent. That is, lane boundaries 432a and 432b may represent a route to be navigated in the course of evaluating a GNSS-based positioning device instead of physical lane boundaries.

In the course of the survey, positioning information was determined for each second reference point 240, as well as for a variety of landmarks 434. Second reference points 240 are separated by spacing lengths 433, which reflect a spacing sufficient to ensure that the second reference points satisfy a required accuracy threshold for the reference trajectory.

Figure 10:
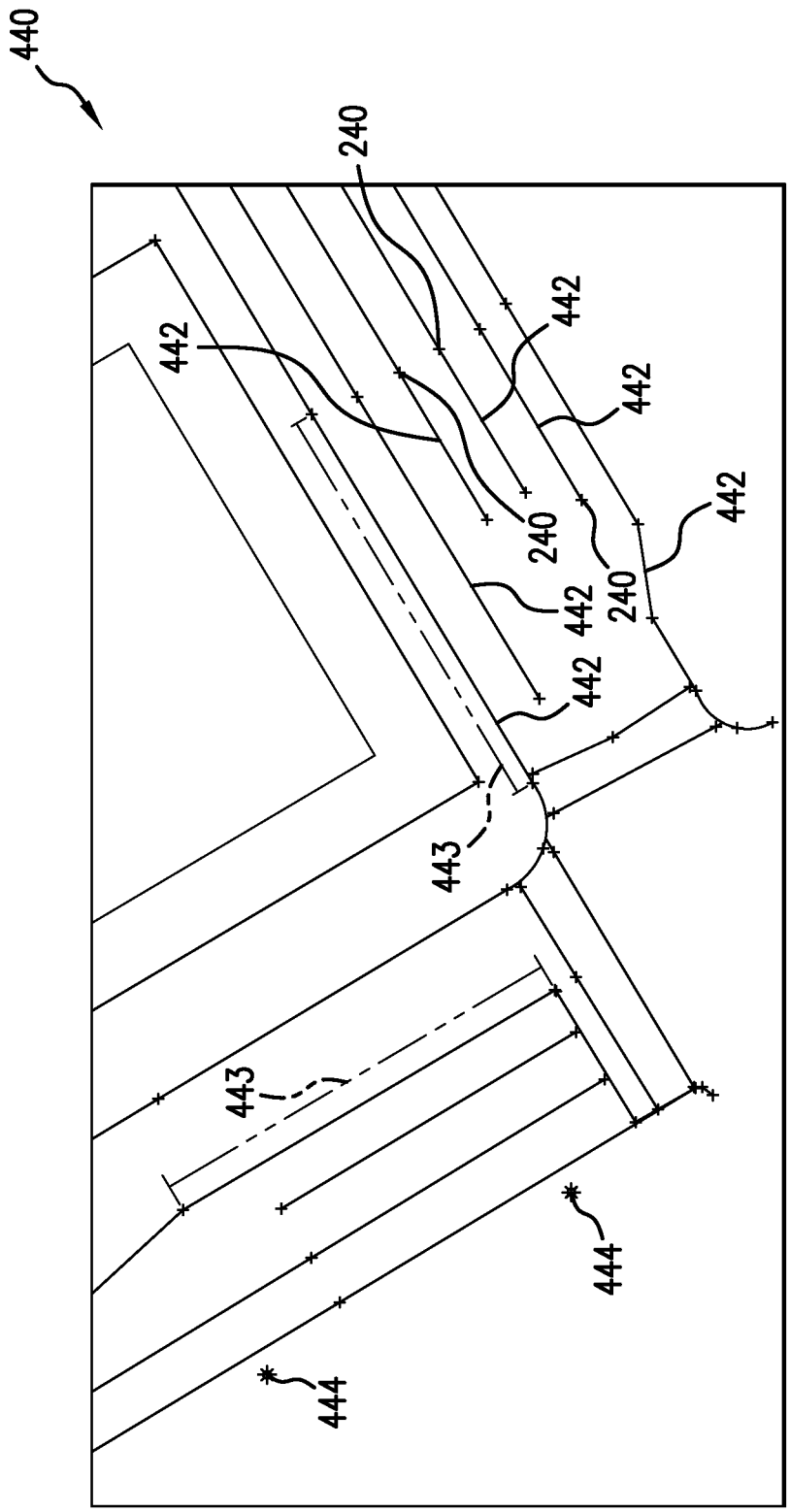
FIG. 10 is an embodiment of a map of a third portion of the reference trajectory, including information resulting from the survey.

Similarly, FIG. 10 is an embodiment of a map 440 of a third portion of reference trajectory 120, including information resulting from the survey. Map 440 depicts second reference points 240 along a plurality of lane boundaries 442. In the course of the survey, positioning information was determined both for second reference points 240 and for a variety of landmarks 434. In FIG. 10, a lane boundary that may be a right-side lane boundary for one lane may also be a left-side lane boundary for another lane. As in FIG. 9, second reference points 240 are separated by spacing lengths 443.

As a result, the survey may produce positioning information for points associated with more than one lane along any given street 11 corresponding with reference trajectory 120. This may occur when, for example, positioning information may be produced for first reference points 230 and second reference points 240 throughout substantially all lane boundaries within part of, or all of, obstructed environment 10. Positioning information produced for points associated with multiple adjacent lanes may be used in determining reference trajectory 120, and may also be used in testing the GNSS-based positioning systems in the event that a lane intended for navigation becomes unavailable.

FIG. 11 is an embodiment of a map 460 of positioning information for a fourth portion of reference trajectory 120. Map 460 includes survey-based boundary lines and a true path, i.e., two lane boundaries 462, true path 160, and true path points 260. Lane boundaries 462 may be determined by positioning information for first reference points 230, second reference points 240, or a combination of the two, depending upon which portion of reference trajectory 120 corresponds with map 460. Similarly, true path 160 and true path points 260 may be determined by positioning information for first reference points 230, second reference points 240, or a combination of the two.

FIG. 12 is an embodiment of another map 470 of positioning information for the fourth portion of reference trajectory 120. Unlike FIG. 11, FIG. 12 does not depict lane boundaries 462. Instead, FIG. 12 depicts true path points 260 spaced more closely together than depicted in FIG. 11. The finer spacing of true path points 260 in FIG. 12 may provide more locations along true path 160 for analyzing measured data gathered with improved GNSS-based positioning systems.

FIG. 6 is an embodiment of a flow diagram depicting a second part 350 of a method for testing improved GNSS-based positioning systems in obstructed environments. Second part 350 includes a plurality of steps 352-368. In step 352, reference trajectory 120 is navigated by a vehicle carrying an improved GNSS-based positioning system, and a plurality of measured points 270 corresponding with reference trajectory 120 is then gathered by the improved GNSS-based positioning system.

Reference trajectory 120 must be carefully navigated. The navigation may be directed by maps, photographs, and other useful diagrams to aid in navigating the desired route. Perfect navigation of the route would be desirable; however, in lieu of perfect navigation, some allowance for human error in navigation may be made. Accordingly, a test driving variability of, for example, 0.3 meters may be suitable to take into account when analyzing measured data gathered during the navigation of reference trajectory 120.

In some embodiments, the vehicle navigating reference trajectory 120 may additionally carry a comparison GNSS-based positioning system of a relatively high grade capable of independently providing GNSS-based positioning information. The comparison GNSS-based positioning system, which may incorporate inertial sensors or differential corrections, may then be used to gather a plurality of comparison points along a comparison path. The comparison GNSS-based positioning system may advantageously be of a lower grade than may otherwise be required for evaluating improved GNSS-based positioning systems.

Figure 13:
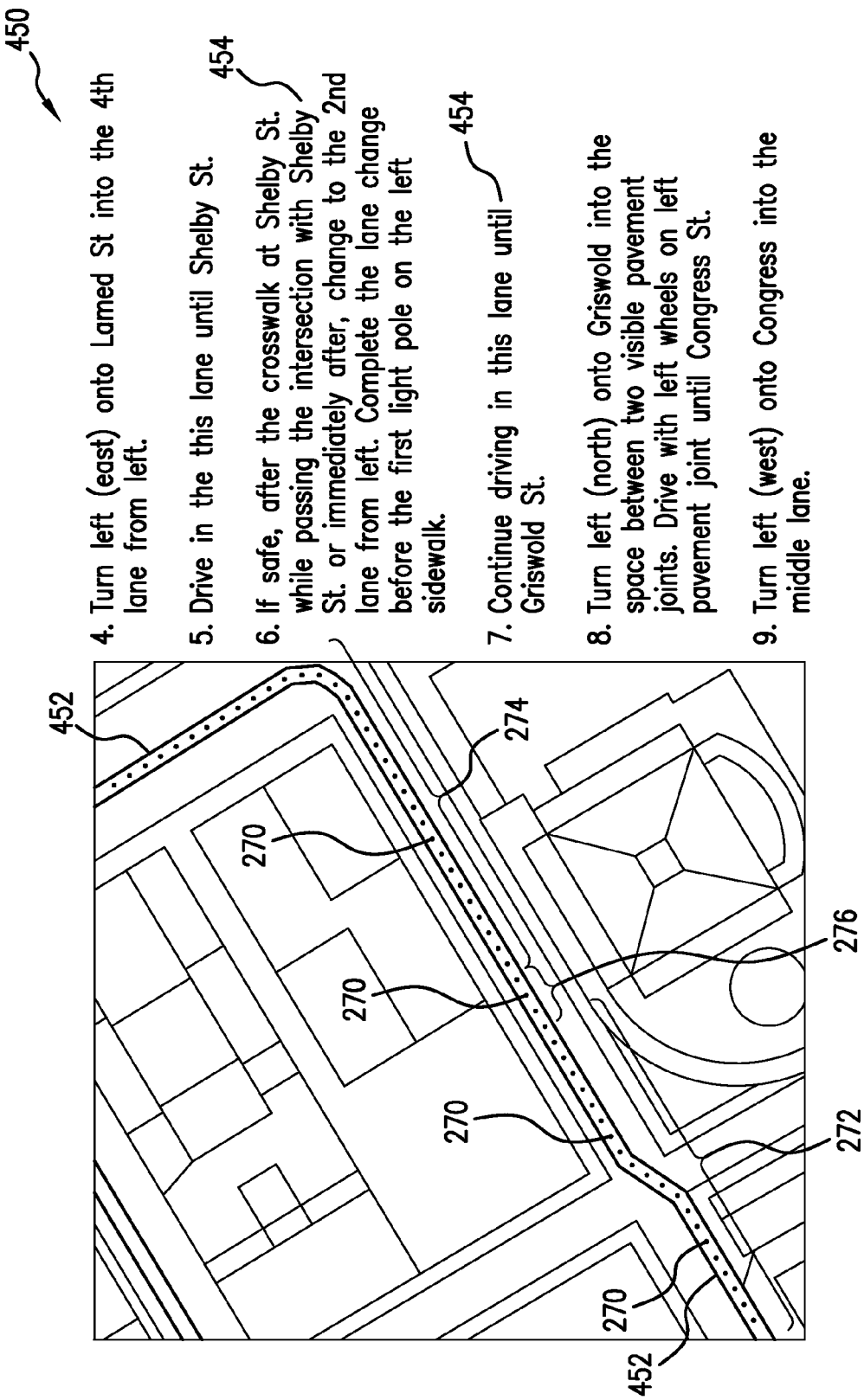
FIG. 13 is an embodiment of a driving instruction diagram corresponding with a fifth portion of the reference trajectory, including information and instructions for gathering measurement data with a GNSS-based positioning system.

FIG. 13 is an embodiment of a driving instruction diagram 450 corresponding with a fifth portion of reference trajectory 120. Driving instruction diagram 450 includes lane boundary indicators 452 and text instructions 454. Lane boundary indicators 452 delimit a path within which the improved GNSS-based positioning system should, ideally, be centrally located during navigation of reference trajectory 120. As depicted in FIG. 13, lane boundary indicators 452 indicate left-side and right-side boundaries of the path to be navigated. Text instructions 454 provide verbal descriptions of the navigation to be performed, and may make reference to various permanent or semi-permanent landmarks related to the navigation, such as road edges, lane markings, and manhole covers.

Lane boundary indicators 452 may correspond in some places with physical lane boundary lines on streets 11, but may in other places not correspond with such lines. Instead, lane boundary indicators 452 serve to help describe the route to be navigated in order to gather measured points along a measured path.

In the course of navigating reference trajectory 120, the improved GNSS-based positioning system gathers positioning information for a plurality of measured points 270. In turn, in step 354 of FIG. 6, measured points 270 are interpolated between or extrapolated from to define a measured path 170.

As indicated in FIG. 13, a first portion 272 of measured points 270 corresponds with portions of reference trajectory 120 in which GNSS availability is good. For example, within first portion 272, an HDOP associated with an attempt at GNSS positioning may be less than or equal to a particular threshold of acceptability, such as 1. Similarly, within first portion 272, a number of available satellites associated with an attempt at GNSS positioning may be greater than or equal to a particular threshold of acceptability, such as 5.

In comparison with first portion 272, a second portion 274 of measured points 270 corresponds with portions of reference trajectory 120 in which GNSS availability is poor. For example, within second portion 274, an HDOP associated with an attempt at GNSS positioning may be greater than or equal to a particular threshold of acceptability, such as 8. Similarly, within second portion 274, a number of available satellites associated with an attempt at GNSS positioning may be less than or equal to a particular threshold of acceptability, such as 3.

Finally, a third portion 276 of measured points 270 corresponds with portions of reference trajectory 120 in which attempts at GNSS positioning may yield no positioning information (i.e., GNSS availability is missing), or positioning information that exceeds an error threshold (i.e., GNSS availability is indeterminate).

Measured points 270 may be characterized by a combined difficulty factor, which may be proportionally related to the percentage of measured points 270 not among first portion 272, and may be proportionally related to the percentage of measured points 270 among either second portion 274 or third portion 276. Additionally, the first percentage may be scaled by a first scaling factor, and the second percentage may be scaled by a second scaling factor, which may sum to 1. For example, the first scaling factor may be 0.3, and the second scaling factor may be 0.7.

In some embodiments, such as those in which positioning information has been produced for reference points 230 and 240 throughout substantially all lane boundaries within part of, or all of, obstructed environment 10, reference trajectory 120 may be determined after the navigation has been performed. In such embodiments, the GNSS-based positioning system may be navigated through the obstructed environment in accordance with a route that is at least partially known before-hand.

However, if a deviation from the route becomes necessary, as might occur in the event of lane closures due to construction, a record may be made of the deviation from the intended route. Subsequently, the recorded deviation may be used to establish reference trajectory 120 as the route that was actually navigated. The sub-set of available reference points 230 and 240 that correspond with reference trajectory 120 may then be used in evaluating the GNSS-based positioning system, thereby protecting the analysis and evaluation of the system despite substantial deviations from the intended route to be navigated. In addition, other special conditions potentially affecting the route may similarly be logged, including weather conditions and/or traffic, and noted during evaluation of the GNSS-based positioning system.

Figure 14:
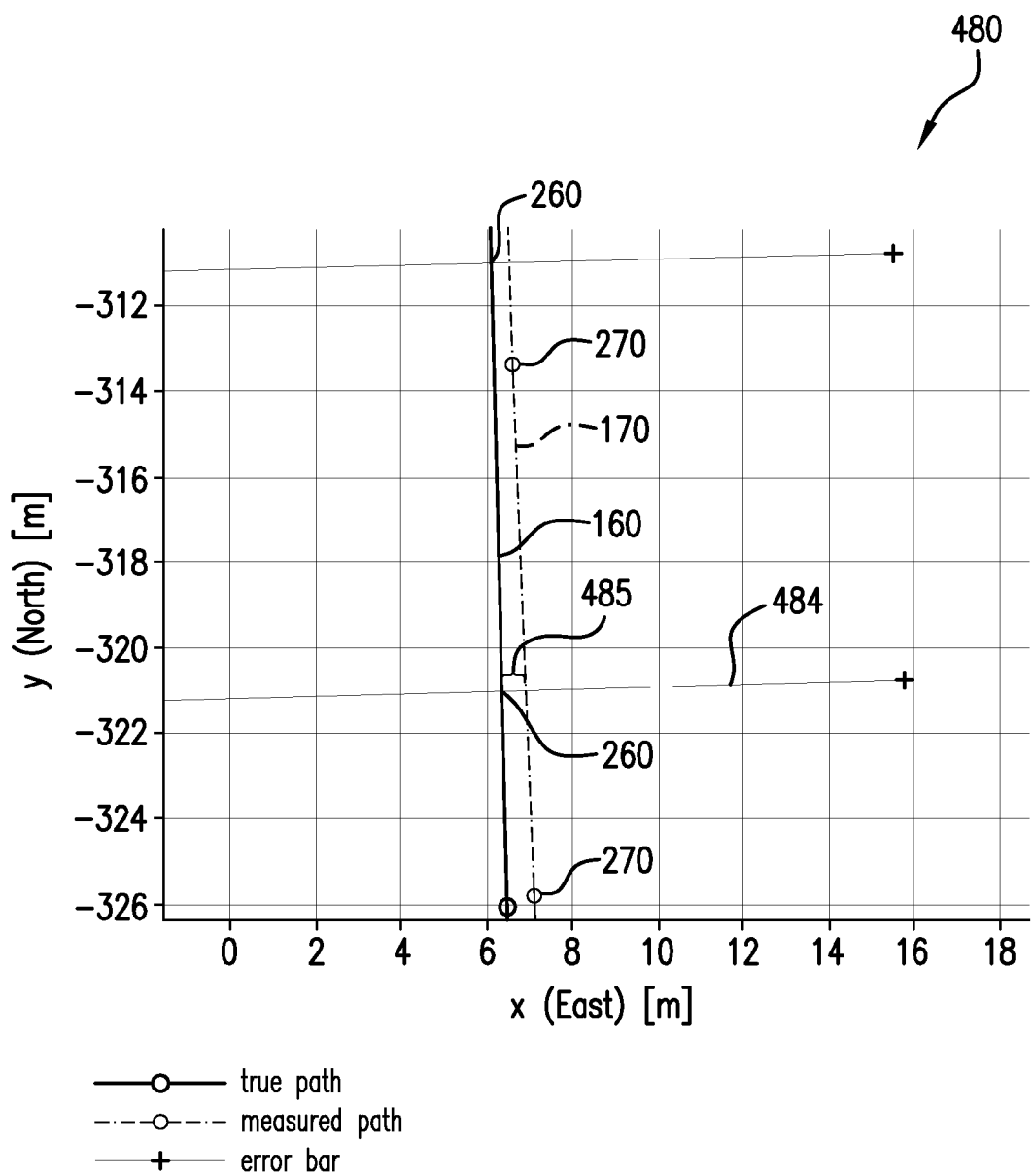
FIG. 14 is an embodiment of a map of positioning information for a sixth portion of the reference trajectory, including the true path, measured data, and error bars.

FIG. 14 is an embodiment of a map 480 of positioning information for a sixth portion of reference trajectory 120. Within this sixth portion are true path 160, two true path points 260 along true path 160, and measured path 170 extrapolated from measured points 270. For each true path point 260, an error bar 484 normal at that point to true path 160 extends outward, intersects measured path 170, and ends beyond the point of intersection. Error bar 484 corresponds with an error threshold. Where error bar 484 reaches and intersects with measured path 170, positioning information associated with the related true path point 260 is within the error threshold. The distance from each true path point 260 to measured path 170 along error bar 484 is an across (or cross-track) error 485 associated with that true path point 260.

In embodiments incorporating a comparison GNSS-based positioning system, the plurality of comparison points along the comparison path may also be used for purposes of determining various errors. For example, instead of determining true path points 260 on the basis of the reference trajectory, true path points 260 may be determined on the basis of the comparison path, i.e., the comparison points as well as points interpolated between or extrapolated from the comparison points. Accordingly, error 485 may be a distance from the comparison path to measured path 170 along a line normal at that point to the comparison path.

Such embodiments may also use the comparison path to determine along errors and vertical errors. For example, when the comparison path is used to determine true path points 160, the distance from each true path point 160 to the measured point 270 in the direction of travel (i.e., the direction parallel to the comparison path), when at the same time (i.e., when having the same time-stamp), may be used to establish an along error. Similarly, the vertical distance from each true path point 160 to the measured point 270, when at the same time, may be used to establish a vertical error.

Figure 15:
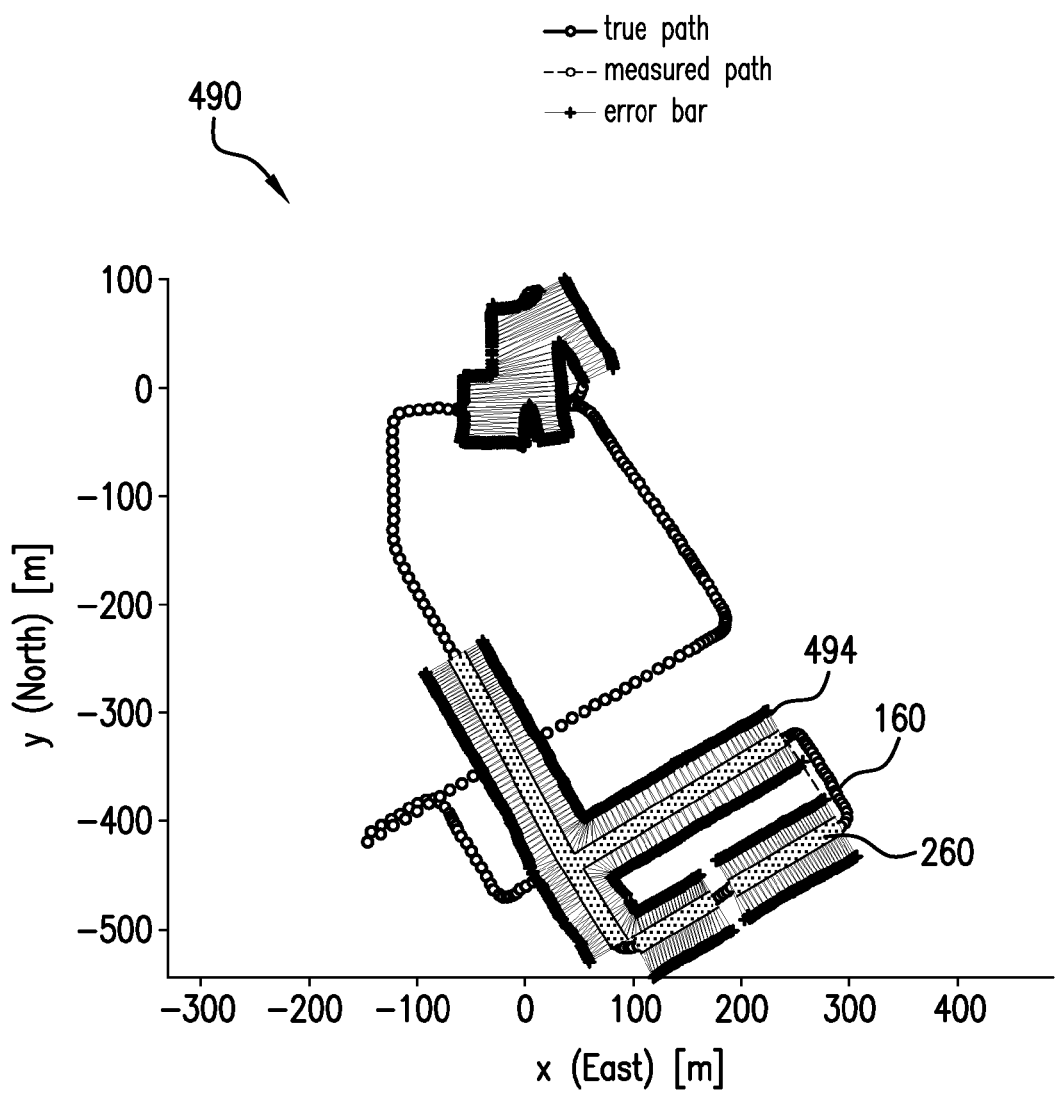
FIG. 15 is an embodiment of a map of positioning information for a seventh portion of the reference trajectory, including the true path, measured data, and error bars.

FIG. 15 is an embodiment of a map 490 of positioning information for a seventh portion of reference trajectory 120. Within this seventh portion are true path 160, a multitude of true path points 260 along true path 160, and a multitude of error bars 494, each associated with a true path point 260. As with FIG. 14, each error bar 494 of FIG. 15 is associated with an error 485. The set of all errors 485 along reference trajectory 120 comprises, in turn, an error data set 512.

Figure 16:
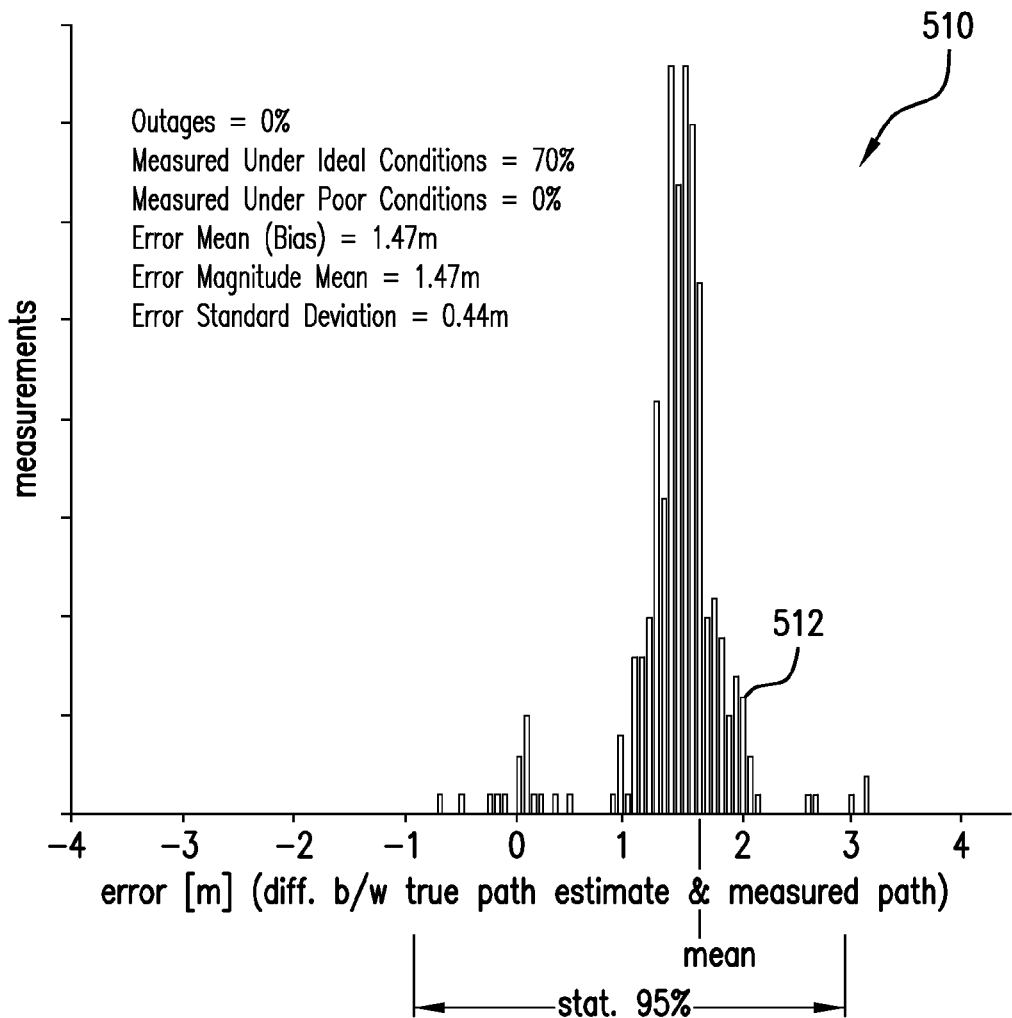
FIG. 16 is an embodiment of a histogram of an error data set.

Returning to FIG. 6, error data set 512 is determined in step 356. Proceeding, in step 358, error data set 512 may be evaluated with respect to a desired statistical characteristic. FIG. 16 depicts a histogram 510 of error data set 512. As depicted, error data set 512 may have an average value, a median value, a mode value, or a standard distribution value, for example, or other statistical characteristics. Such values derived from error data set 512 may then be evaluated with respect to a desired statistical characteristic. For example, a desired statistical characteristic may represent a maximum average value, or a maximum standard distribution.

Figure 17:
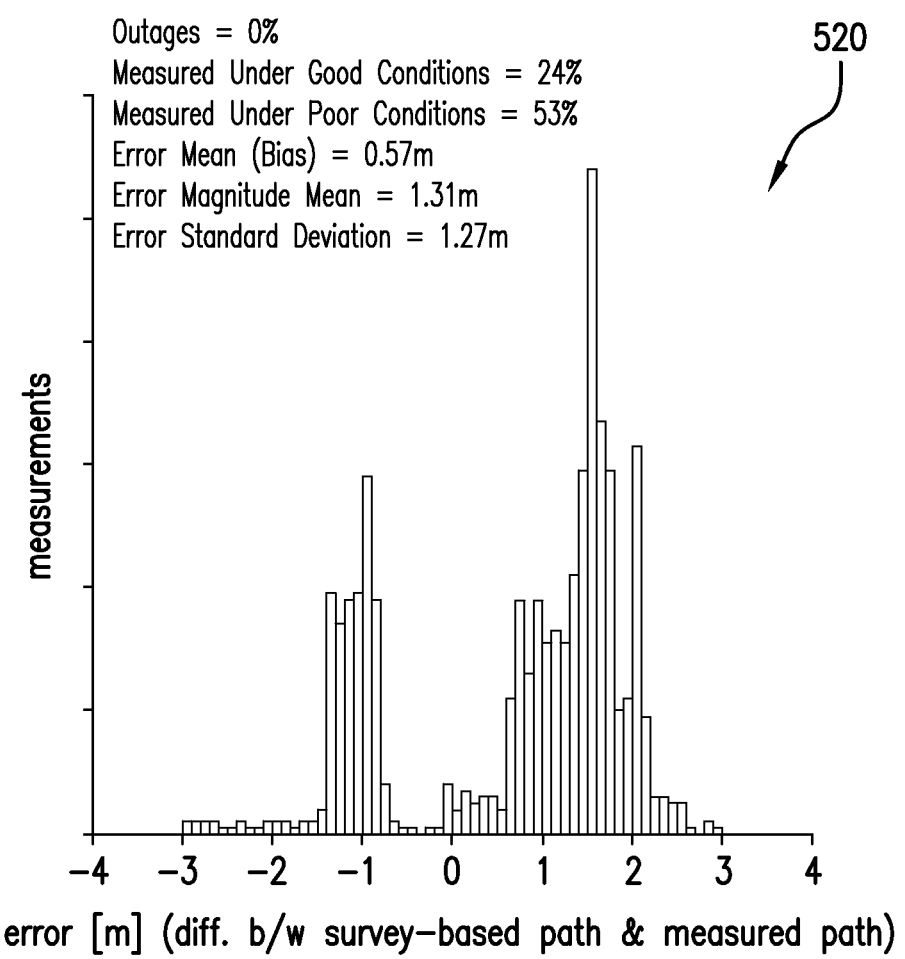
FIG. 17 is an embodiment of a histogram of an additional error data set.

Alternatively, steps 362-366 may provide an additional error data set 522 against which error data set 512 may be compared. More particularly, in step 362, reference trajectory 120 may be navigated by a vehicle carrying an additional improved GNSS-based positioning system, which may gather a plurality of additional measured points 280. Similarly, in step 364, additional measured points 280 may be interpolated between or extrapolated from to derive an additional measured path 180. In step 366, additional error data set 522 may then be established with respect to additional measured path 180. FIG. 17 depicts a histogram 520 of additional error data set 522, which may have an average value, a median value, a mode value, a standard distribution value, or other statistical characteristics.

In step 368, error data set 512 may then be compared with additional error data set 522. For example, a statistical characteristic of error data set 512 may be compared with a statistical characteristic of error data set 522. Subsequently, in step 370, a selection may be made between the improved GNSS-based positioning system and the additional improved GNSS-based positioning system, based upon the comparison of error data set 512 and error data set 522. In this manner, error data sets 512 and 522 may be analyzed or evaluated on the basis of one or more statistical characteristics. Other aspects of error data sets 512 and 522 may also be used in analyzing or evaluating error data sets 512 and 522.

In some embodiments, the various points and routes discussed above may correspond with information captured, recorded, and stored in a database. For example, positioning information for reference points 230 and 240 may be stored in a database. A vehicle bearing an improved GNSS-based positioning system may then be navigated along an intended route, and measured points 270 obtained by the system may be recorded and stored in a database. At the same time, the vehicle may also bear a comparison GNSS-based positioning system, and comparison points obtained by the comparison system may be recorded and stored in a database. Reference points 230 and 240, measured points 270, and the comparison points may then be selected from the database and used to produce an error data set for analysis and evaluation.

While various embodiments of the invention have been described, the description is intended to be exemplary rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method for testing at least one Global Navigation Satellite System (GNSS)-based positioning system, which is incorporated in a vehicle, along a reference trajectory within an obstructed environment having a first area and a second area, a GNSS availability within the first area being greater than a GNSS availability within the second area, the method comprising:
    establishing positioning information using a GNSS receiver of a first GNSS-based positioning system for each of a plurality of first reference points in the first area of the obstructed environment;
    selecting a plurality of second reference points within the second area of the obstructed environment to ensure that an accuracy of surveyed positioning information for the second reference points is within a selected accuracy range for the reference trajectory;
    surveying from the first reference points to establish positioning information for each of the plurality of second reference points;
    gathering positioning information for a plurality of measured points corresponding to the reference trajectory based on the plurality of first and second reference points using the first GNSS-based positioning system; and
    determining a statistical characteristic of the measured points, wherein the statistical characteristic is selected from a group consisting of an average value, a median value, a mode value, and a standard distribution value.

2. The method of claim 1, wherein the selection of the second reference points includes spacing the second reference points to ensure that the accuracy of the positioning information for the second reference points is within the selected accuracy range for the reference trajectory.

3. The method of claim 1, wherein the surveying further includes defining a first lane boundary and a second lane boundary, and the second reference points are along a lane centerline between the first lane boundary and the second lane boundary.

4. The method of claim 1, wherein the plurality of second reference points comprise a plurality of points positioned between surveyed points.

5. The method of claim 1, wherein a GNSS availability of a first portion of the measured points is greater than a GNSS availability of a second portion of the measured points.

6. The method of claim 5, wherein the GNSS availability of the first portion is configured to have both (a) a number of visible satellites that is 5 or more, and (b) a horizontal dilution of precision that 1 or less.

7. The method of claim 5, wherein the GNSS availability of the second portion is configured to have at least one of (a) a number of visible satellites that is 3 or less, and (b) a horizontal dilution of precision that is at 8 or more.

8. The method of claim 5, wherein a GNSS availability of a third portion of the measured points is configured to have at least one of (a) GNSS availability being missing, or (b) GNSS availability being indeterminate.

9. The method of claim 1, further comprising using a second GNSS-based positioning system to gather a plurality of additional measured points corresponding to with the reference trajectory.

10. The method of claim 9, further comprising determining (a) a first error data set that includes a separation between each of the second reference points and an interpolation among the plurality of measured points, and (b) a second error data set that includes a separation between each of the second reference points and an interpolation among the additional plurality of measured data points.

11. The method of claim 10, further comprising selecting one of the first and second GNSS-based positioning systems based upon a comparison of the first error data set and the second error data set.

12. The method of claim 11, wherein a statistical characteristic of the first error data set is compared to a statistical characteristic of the second error data set, and wherein the statistical characteristic is selected from a group consisting of an average value, a median value, a mode value, and a standard distribution value.

13. The method of claim 11, wherein the GNSS availability within the second area is configured to have at least one of (a) a number of visible satellites that is 3 or less, and (b) a horizontal dilution of precision that is at 8 or more, and the GNSS availability within the first area is configured to have both (a) a number of visible satellites that is 5 or more, and (b) a horizontal dilution of precision that 1 or less.

14. The method of claim 1, further comprising:
    determining a route for the reference trajectory; and
    selecting a sub-set of the first reference points and a sub-set of the second-reference points corresponding with the route.

15. The method of claim 1, further comprising:
    using a third GNSS-based positioning system to gathering a plurality of comparison points; and
    determining an error data set that includes a separation between each of the comparison points and one of (a) an interpolation among the plurality of measured points and (b) a corresponding point of the plurality of measured points.

16. A method for producing a reference trajectory for testing at least one Global Navigation Satellite System (GNSS)-based positioning system, which is incorporated in a vehicle, in obstructed environments, the method comprising:
specifying an accuracy range for the reference trajectory;
locating within the obstructed environment a plurality of first areas and a plurality of second areas outside the first areas, a GNSS availability within the first areas being greater than a GNSS availability within the second areas, and an accuracy of GNSS-based positioning information within the second areas not being within the accuracy range;
establishing positioning information using a GNSS receiver of a first GNSS-based positioning system for a plurality of first reference points, the first reference points being within the first areas, and the positioning information for the first reference points being within the accuracy range;
selecting a plurality of second reference points inside the second areas to enable surveyed positioning information for the second reference points to be within the accuracy range;
surveying to establish positioning information for the plurality of second reference points, the positioning information for the second reference points being based on the positioning information for the first reference points;
determining a plurality of true path points corresponding to a lane centerline based upon the positioning information for at least the second reference points;
gathering (a) a plurality of first measured points using the first GNSS-based positioning system by navigating the reference trajectory with the first GNSS-based positioning system, and (b) a plurality of second measured points using a second GNSS-based positioning system by navigating the reference trajectory with the second GNSS-based positioning system;
interpolating (a) a first measured path from the first measured points, and (b) a second measured path from the second measured points;
determining (a) a first error data set based upon a distance from each of the true path points to the first measured path, and (b) a second error data set based upon a distance from each of the true path points to the second measured path; and
selecting one of the first and second GNSS-based positioning systems based upon a comparison of the first error data set to the second error data set.

17. The method of claim 16, wherein the obstructed environment is an interconnected plurality of streets.

18. The method of claim 16, wherein the positioning information includes a longitude and a latitude.

19. The method of claim 16, wherein the configuration of the second reference points includes a spacing.

20. The method of claim 16, wherein both the first reference points and the second reference points include points along each of a first lane boundary and a second lane boundary.

21. The method of claim 20, wherein the true path points are along a lane centerline between the first lane boundary and the second lane boundary.

22. The method of claim 16, wherein a GNSS availability of a first portion of the measured points is greater than a GNSS availability of a second portion of the measured points, and a GNSS availability of a third portion of the measured points is either (a) missing or (b) indeterminate.

23. A method for testing at least one Global Navigation Satellite System (GNSS)-based positioning system, which is incorporated in a vehicle, along a reference trajectory within an obstructed environment having a first area and a second area, a GNSS availability within the first area being greater than a GNSS availability within the second area, the method comprising:
specifying an accuracy range for the reference trajectory;
establishing positioning information using a GNSS receiver of a first GNSS-based positioning system for a plurality of first reference points within the first area of the obstructed environment;
selecting a plurality of second reference points within the second area of the obstructed environment to ensure that an accuracy of surveyed positioning information for the second reference points is within the accuracy range;
surveying from the first reference points to establish positioning information for the plurality of second reference points;
gathering a plurality of measured points corresponding to the reference trajectory based on the plurality of first and second reference points using the first GNSS-based positioning system;
determining an error data set based upon a distance from each of the second reference points to a linear interpolation among the plurality of measured data points; and
determining a statistical characteristic of the error data set, wherein the statistical characteristic is selected from a group consisting of an average value, a median value, a mode value, and a standard distribution value.

24. The method of claim 23, wherein the plurality of second reference points comprise a plurality of points positioned between surveyed points.

25. The method of claim 23, further comprising comparing a statistical characteristic of the error data set to statistical characteristic of an additional error data set, wherein the statistical characteristic is selected from a group consisting of an average value, a median value, a mode value, and a standard distribution value.

* * * * *